US007272745B2

(12) United States Patent
Seto (10) Patent No.: US 7,272,745 B2
(45) Date of Patent: Sep. 18, 2007

(54) DATA PROTECTION SYSTEM

(75) Inventor: Pak-Lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 497 days.

(21) Appl. No.: 10/881,648

(22) Filed: Jun. 30, 2004

(65) Prior Publication Data

US 2006/0005061 A1    Jan. 5, 2006

(51) Int. Cl.
*G06F 11/00* (2006.01)
(52) U.S. Cl. ........................................ 714/3
(58) Field of Classification Search ............ 714/3, 714/27, 31, 43, 56, 15, 18; 709/203, 227; 712/26, 28; 710/33, 11
See application file for complete search history.

(56) References Cited

U.S. PATENT DOCUMENTS

| 6,205,565 | B1 |   | 3/2001 | Bissett et al. |        |
|-----------|----|---|--------|----------------|--------|
| 6,536,000 | B1 | * | 3/2003 | Jackson et al. | 714/57 |
| 6,684,269 | B2 | * | 1/2004 | Wagner         | 710/33 |
| 6,694,387 | B2 | * | 2/2004 | Wagner         | 710/33 |
| 2002/0099967 | A1 | * | 7/2002 | Kawaguchi   | 713/323 |
| 2004/0017820 | A1 |   | 1/2004 | Garinger et al. |      |

FOREIGN PATENT DOCUMENTS

EP    0747833 A2    12/1996

OTHER PUBLICATIONS

"American National Standard for Imformation Technology- Fibre Channel-Physical and Signalling Interface-3 (FC-PH-3)", *Developed by incits, Where IT all Begins, Table of Contents*, (1998),6 pgs.
"PCI Express Base Specification Revision 1.0", *PCI Express, Table of Contents*, (Jul. 22, 2002), 15 pgs.
"PCI-X Addendum to the PCI Local Bus Specification", *Revision 1.0a, Table of Contents*, (Jul. 24, 2000), 9 pgs.
"Serial ATA: High Speed Serialized AT Attachment, Serial ATA Workgroup", *Revision 1.0, Table of Contents*, APT Technologies, Inc.,(Aug. 29, 2001), 10 pgs.
"Working Draft American National Standard, Project T10/1601-D", *Revision 1, Table of Contents*, Information Technology- Serial Attached SCSI- 1.1 (SAS-1.1),(Sep. 18, 2003),24 pgs.
"HyperTransport I/O Link Specification Revision 1.10", *Copy Right: 2001, 2002 & 2003: HyperTransport Technology Consortium*, (Aug. 26, 2003),1-330.
"PCT Search Report and Written Opinion" for Application Serail No. PCT/US2005/022571 (Client Ref: 80107.122WO1), 15 pgs, Jun. 24, 2005.

* cited by examiner

*Primary Examiner*—Nadeem Iqbal
(74) *Attorney, Agent, or Firm*—Grossman, Tucker, Perreault, & Pfleger, PLLC (57) ABSTRACT

A method according to one embodiment may include assigning a tag to at least one transactions in which at least one data frame is at least one of transmitted or received by at least one functional block. The method may also include discovering, by a functional block, if an error occurs in at least one data frame. The method may also include associating the error with the tag and generating a flush command to at least one functional block to flush data frames associated with said tag. Of course, many alternatives, variations, and modifications are possible without departing from this embodiment.

24 Claims, 5 Drawing Sheets

| | SOURCE | FBN | FB3 | FB2 | FB1 | DESTINATION |
|---|---|---|---|---|---|---|
| T0 | F0 | F0 | | | | |
| T1 | F1 | F1 | F0 | | | |
| T2 | F2 | F2 | F1 | F0 | | |
| T3 | F3 | F3 | F2 | F1 - ERROR DETECTED | | |
| T4 | F4 | F4 | F3 | F2 | | |
| T5 | F5/\<FLUSH\> | F5/\<FLUSH\> | | | | |
| T6 | F6 | | \<FLUSH\> | | | |
| T7 | | | | \<FLUSH\> | | |
| T8 | | | | GENERATE \<END/DONE\> | \<FLUSH\> | |
| T9 | | | | | \<END/DONE\> | \<FLUSH\> |
| T10 | | | | | | \<END/DONE\> |
| T11 | | | | | | |

300 ← (table)
302 ← FB1 column
304 ← T-row labels

FIG. 4

| | SOURCE | FBN | FB3 | FB2 | FB1 | DESTINATION |
|---|---|---|---|---|---|---|
| T0 | F0/TAG(A) | | | | | |
| T1 | F0/TAG(B) | F0/TAG(A) | | | | |
| T2 | F1/TAG(B) | F0/TAG(B) | F0/TAG(A) | | | |
| T3 | F1/TAG(B) | F1/TAG(B) | F0/TAG(B) | F0/TAG(A) | | |
| T4 | F2/TAG(A) | F1/TAG(A) | F1/TAG(B) | F0/TAG(B) | F0/TAG(A) | |
| T5 | F3/TAG(A) | F2/TAG(A) | F1/TAG(A) – ERROR DETECTED | F1/TAG(B) | F0/TAG(B) | F0/TAG(A) |
| T6 | F2/TAG(B) – <FLUSH TAG(A)> | F3/TAG(A) | | | F1/TAG(B) | F0/TAG(B) |
| T7 | F3/TAG(B) | F2/TAG(B) – <FLUSH TAG(A)> | F2/TAG(B) | | | F1/TAG(B) |
| T8 | F4/TAG(B) | F3/TAG(B) | <FLUSH TAG(A)>/ GENERATE <END/DONE TAG(A)> | F2/TAG(B) | | |
| T9 | | F4/TAG(B) | F3/TAG(B) | <END/DONE TAG(A)> | F2/TAG(B) | |
| T10 | | | F4/TAG(B) | F3/TAG(B) | <END/DONE TAG(A)> | |
| T11 | | | | F4/TAG(B) | F3/TAG(B) | <END/DONE TAG(A)> |
| T12 | | | | | F4/TAG(B) | F3/TAG(B) |

Fig. 5

DATA PROTECTION SYSTEM

FIELD

The present disclosure relates to data protection system.

BACKGROUND

In one conventional data processing system, data packets travel through the system through many buses, memory buffers, DMA control blocks, etc., between the origin and the final destination. Some conventional systems employ a design that has data flowing through the system in a small packet data format. In order to minimize I/O (input/output) processing latency, many conventional systems employ a pipelined data processing design, i.e., before the last data packet reaches a destination, the source issues a request (transfer) of the next data packet. In order to sustain the integrity of data, some conventional systems must be able to keep track of all outstanding data packets until each of the packets reach their destination. Moreover, in conventional data processing systems, if an error occurs while the data packet is traveling through the system, I/O control mechanisms must be able to correlate the error reported from an I/O with an outstanding data packet from the I/O. This type of control tends to be particularly complex, especially when handled by a single I/O control mechanism. Moreover, in some conventional system, when an error gets reported the system may halt data transfers on that I/O until the error is sorted out, or alternatively, an interrupt is generated to halt all data flow along a particular data path. Thus, conventional data processing systems are incapable of handling errors without requiring significant processor interaction and further, without suspending operations along a data path.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
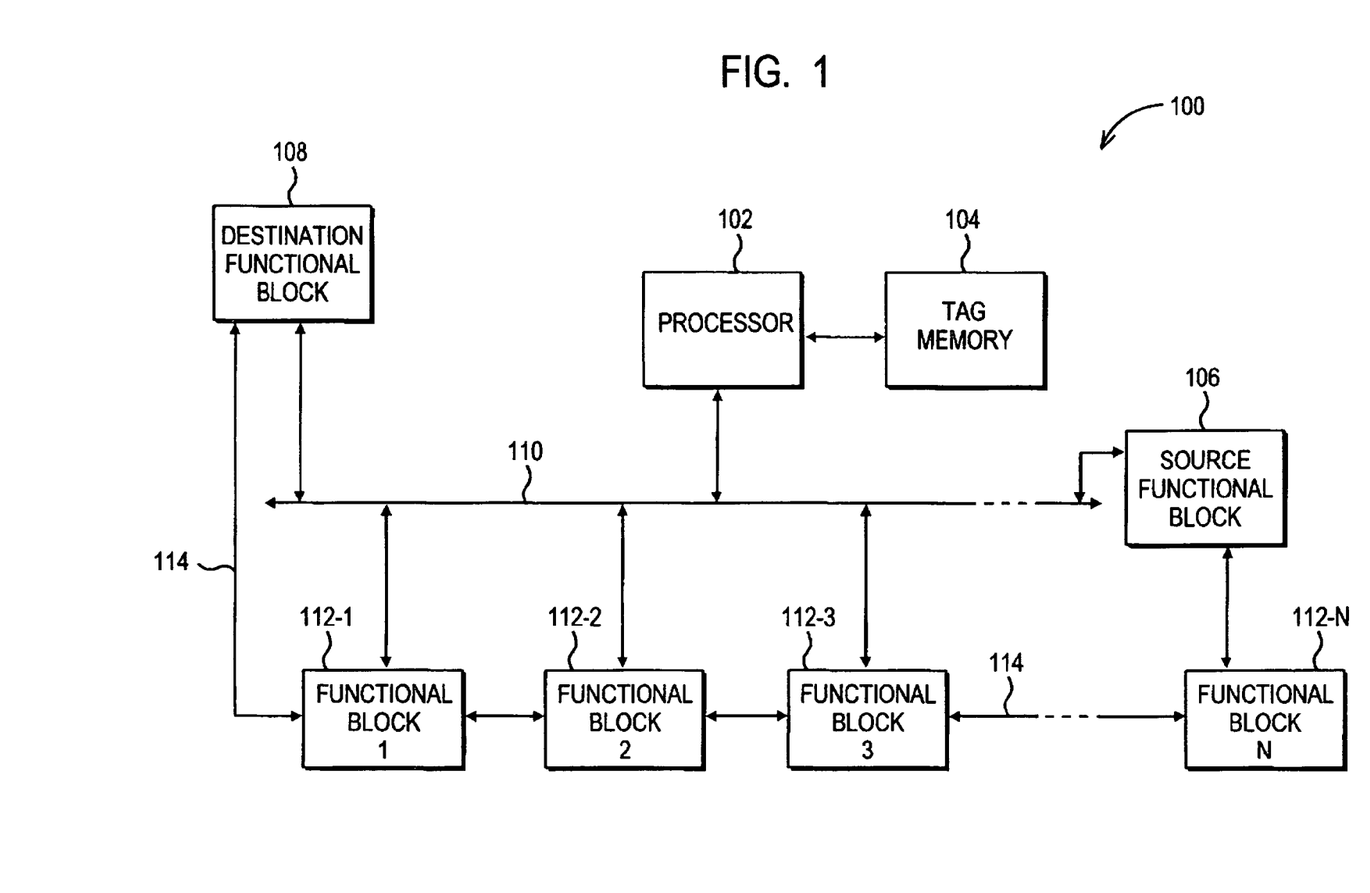
FIG. 1 is a diagram illustrating an exemplary system embodiment.

FIG. 1 illustrates a system embodiment 100 of the claimed subject matter. The system 100 may include processor circuitry 102 (hereinafter "processor") that may be coupled to a bus 110. Processor 102 may exchange commands with a source functional block 106 and/or a destination functional block 108. A data path 114 may exist between source functional block 106 and destination functional block 108. Coupled along the data path may be one or more intermediate functional blocks, i.e., for example, functional block 1 (112-1), functional block 2 (112-2), functional block 3 (112-3), . . . , functional block N (112-N). These will be referred to herein as FB1, FB2, FB3 and FBN, respectively. Each of the intermediate functional blocks FB1, FB2, FB3 . . . FBN may also be coupled to bus 110 to exchange commands and data with processor 102.

"Functional block", as used in any embodiment herein, may be defined as circuitry that is capable of at least one of transmitting and receiving at least one data frame. "Data frame", as used in any embodiment herein, may be defined as a sequence of one or more symbols. For example, in the embodiment of FIG. 1, the destination functional block 108 may be capable of requesting one or more data frames from a source functional block 106. Source functional block 106, in turn, may be capable of locating the requested data, which may include communicating with an external data source (not shown), and transmitting the requested data. Intermediate Functional blocks 112-1 . . . 112-N may be capable of, at least one of transmitting and receiving, data frames from one functional block to the next (i.e., along data path 114), and may further be capable of performing specific tasks, for example, direct memory access (DMA) requests, data store requests, data transmission requests, and/or other functions. Also, as used in any embodiment herein, "circuitry" may comprise, for example, singly or in any combination, hard-wired circuitry, programmable circuitry, state machine circuitry, and/or firmware that stores instructions executed by programmable circuitry.

The system embodiment 100 illustrated in FIG. 1 may represent an exemplary collection of functional blocks that may exist at the integrated circuit (IC) level, between multiple ICs, and/or at a system level which may include one or more computer systems communicating over one or more data paths. As used herein, an "integrated circuit" means a semiconductor device and/or microelectronic device, such as, for example, a semiconductor integrated circuit chip. Thus, functional blocks depicted in FIG. 1 may comprise, for example, individual circuit modules associated with an integrated circuit or group of integrated circuits forming an ASIC. Alternatively, and fully consistent with this embodiment, the functional blocks depicted in FIG. 1 may comprise individual integrated circuits each capable of performing one or more functional tasks that may be associated with a data transfer between a source and a destination. Further alternatively, and still consistent with this embodiment, the functionality associated with the functional blocks depicted in FIG. 1 may be distributed among components in integrated system (for example, the functional blocks may be distributed among a plurality of computer systems, where a data path may be defined between the systems.). Thus, the system embodiment 100 is intended to be of broad scope, and the present disclosure is intended to be applicable wherever a data path exists between one or more functional blocks.

Without departing from the scope of this embodiment, and only as an example, destination functional block 108 may comprise a host system and source functional block 106 may comprise one or more mass storage devices. In such an example, the host system 108 may issue a command to one or more mass storage devices to begin a data transfer from the storage device to the host system. The host system may comprise, for example, a computer system that is capable of communicating with one or more storage devices over a communication link (not shown). Intermediate functional blocks, i.e., functional blocks between the source and the destination (e.g., FB1, FB2, FB3, . . . ,FBN), may comprise, for example, one or more integrated circuits associated with a host bus adapter (not shown). The host bus adapter may be capable of communicating with a storage device using one or more communications protocols.

Processor 102 may be capable of carrying out operations, or causing operations to be carried out, for data transfers between the source 106 to the destination 108 (or vice-versa), and may further include carrying out operations, or causing operations to be carried out, in one or more functional block (i.e., FB1, FB2, FB3 . . . FBN) along the data path 114 between the source 106 and destination 108. Thus, for example, processor 102 may receive a data transfer request from a destination functional block 108, and may further issue commands to a source functional block 106 to transfer the requested data. Such a data transfer command may also request that a specified data path be used, for example, data path 114 through one or more intermediate functional blocks (i.e., FB1, FB2, FB3 . . . FBN) along the data path. Processor 102 may comprise a processor associated with a particular IC (for example processor associated with an application specific integrated circuit (ASIC)) that may be responsible for operations within such an IC. Alternatively, without departing from this embodiment, processor 102 may comprise a broader system-level processor that may be responsible for operations at a system level, for example, data transfers between ASICs, between modules within a system, or between systems over one or more communication links.

"Processor" as used herein, may comprise hardwired circuitry, programmable circuitry, and/or state machine circuitry. The processor 102 may comprise respective circuitry that may be compatible and/or in compliance with the Intel® XScale™ Core micro-architecture described in "Intel® XScale™ Core Developers Manual," published December 2000 by the Assignee of the subject application. Of course, processor circuitry 102 may comprise other types of processor core circuitry without departing from this embodiment. System 100 may also comprise tag memory 104. Tag memory 104 may comprise, for example, computer-readable program instruction memory that may contain respective sets of micro-code program instructions that processor 102 may execute. The execution of these respective sets of program instructions by processor 102 may result in the carrying out of operations described herein as being carried out by processor 102, and/or one or more of functional blocks depicted in FIG. 1. Tag memory 104 may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memories 104 each may comprise other and/or later-developed types of computer-readable memory.

In one exemplary system embodiment, such as system 100 of FIG. 1, a stream of data frames may travel through the system via data path 114, for example, starting from source functional block 106, through one or more functional blocks (i.e., 112-1, 112-2, 112-3 . . . 112-N) to a final destination represented by destination functional block 108. In this exemplary embodiment, data traveling through the system 100 may be performed in a pipelined manner. "Pipelined", as used in any embodiment herein, may be defined as a stream of data frames which may exist at a plurality of functional blocks in the data path. Thus, for example, in a pipelined system embodiment depicted in FIG. 1, before the first frame of data reaches the destination 108 (from source 106), the source 106 issues a command to transfer the next data frame.

Processor 102 may affix a tag to one or more input/output (I/O) transactions in the system. "I/O", as used in any embodiment herein, may be defined as a transaction. A transaction may comprise, for example, a read and/or write request between a source functional block and a destination functional block (or vice-Versa). In a read and/or write request, for example, one or more data frames may originate from a source (e.g., source functional block 106) and be directed to a destination (e.g., destination functional block 108), and may further travel through one or more intermediate functional blocks (e.g., FB1, FB2, FB3 . . . FBN). A tag may comprise, for example, a unique identifying label for a particular I/O. A tag may also comprise transfer offset and/or frame-type identification data, and such data may be used to determine where the frame belongs in an I/O. A label may comprise, for example, a context pointer which may be stored, for example, in tag memory 104. The context pointer may comprise a numeric reference (for example a 16 or 32-bit number).

With continued reference to FIG. 1, and by way of example, processor 102 may receive an instruction from a destination functional block 108 to retrieve data from a source functional block 106. Source functional block 106 may be capable of transmitting data, in the form of one or more data frames, through the system 100 via data path 114. Each functional block between the source 106 and destination 108, along data path 114, may in turn be capable of performing operations with respect to one or more data frames traveling through the functional block. Thus, functional blocks coupled along a data path 114 may be capable of processing one or more data frames, and may further be capable of transmitting and/or receiving one or more data frames. In this example, a plurality of data frames may be transmitted through the system 100 in a pipelined manner, for example, as defined herein.

When a functional block is processing a data frame and an error occurs, the functional block may be capable of discovering the error and reporting the error to the processor 102. The processor 102 may be capable of associating the error with a tag assigned to the I/O associated with the errored frame. The error associated with the tag assigned to a data frame may be stored in tag memory 104. "Error", as used in any embodiment herein, is to be given a broad definition and may mean, for example, any error which may result from processing a data frame (for example, data parity check error) and/or an error associated with transmitting and/or receiving a data frame. In this embodiment, upon the occurrence of an error, processor 102 may further be capable of generating one or more commands to a source functional block 106. For example, upon the occurrence of an error, processor 102 may be capable of generating a drop and/or ignore command for the I/O that posts an error. For example, if an error is initially detected in FB3, processor 102 may issue a command to the source functional 106 block to discontinue retrieving data frames associated with that tag (I/O). The drop and/or ignore command may be propagated through each functional block along the data path 114, which may start at the source functional block 106 and propagate through each functional block until the command reaches the functional block that originally posted the error, in this example FB3, in a manner more fully described below.

For a given I/O, data frames may be queued within the system (i.e., queued data frames from the source functional block 106 which may exists anywhere along the data path 114). In this embodiment, data frames that have been processed in at least one functional block before an error occurs may be permitted to be transmitted to the next functional block until those data frames reach a destination. Processor 102 may also be capable of issuing a flush command to all or selected functional blocks along the data path to flush data packets associated with the errored tag. For example, such a command may be of the form <flush tag (A)> indicating, at least in part, that data packets associated with tag (A) may be ignored and/or dropped by a functional block. Such a flush command may be propagated through the system, for example, by propagating the command through each functional block along a data path. When the flush command reaches the functional block that originally generated the error associated with Tag (A), that functional block may be capable of generating a signal to processor 102 indicative of the fact that a flush command has been processed by the functional block. Processor 102 may be capable of receiving the signal indicative of the fact that a flush command has been processed by the functional block that originally posted the error, and may further be capable of interpreting the reception of that signal as an indication that the data frames associated with the errored tag have been flushed from the system. Thus, in this example, each functional block may operate to flush an I/O that contains one or more errors in one or more data frames from the system 100, and thus, the task of monitoring and clearing an error in such a system may be distributed among one or more functional blocks.

When processor 102 receives the signal indicative of the fact that a flush command has been processed by the functional block that originally posted the error, the functional block may be capable of generating a command indicating that the processing of data packets for the errored I/O is complete. Additionally or alternatively, processor 102 may be capable of generating a command indicating that processing for the errored I/O is ended. Such a command may be of the form <end/done>, and may be processed by the functional block that originally posted the error message. The <end/done> command may be propagated through each functional block until the command is processed by the destination functional block 108. The destination functional block may transmit a signal to processor 102 indicating that processing for the errored I/O is complete. Upon receiving an end/done command, the destination functional block 108 may generate a signal to processor 102 to terminate the errored I/O. Processor 102 may reattempt a data transfer for the errored I/O.

Figure 2:
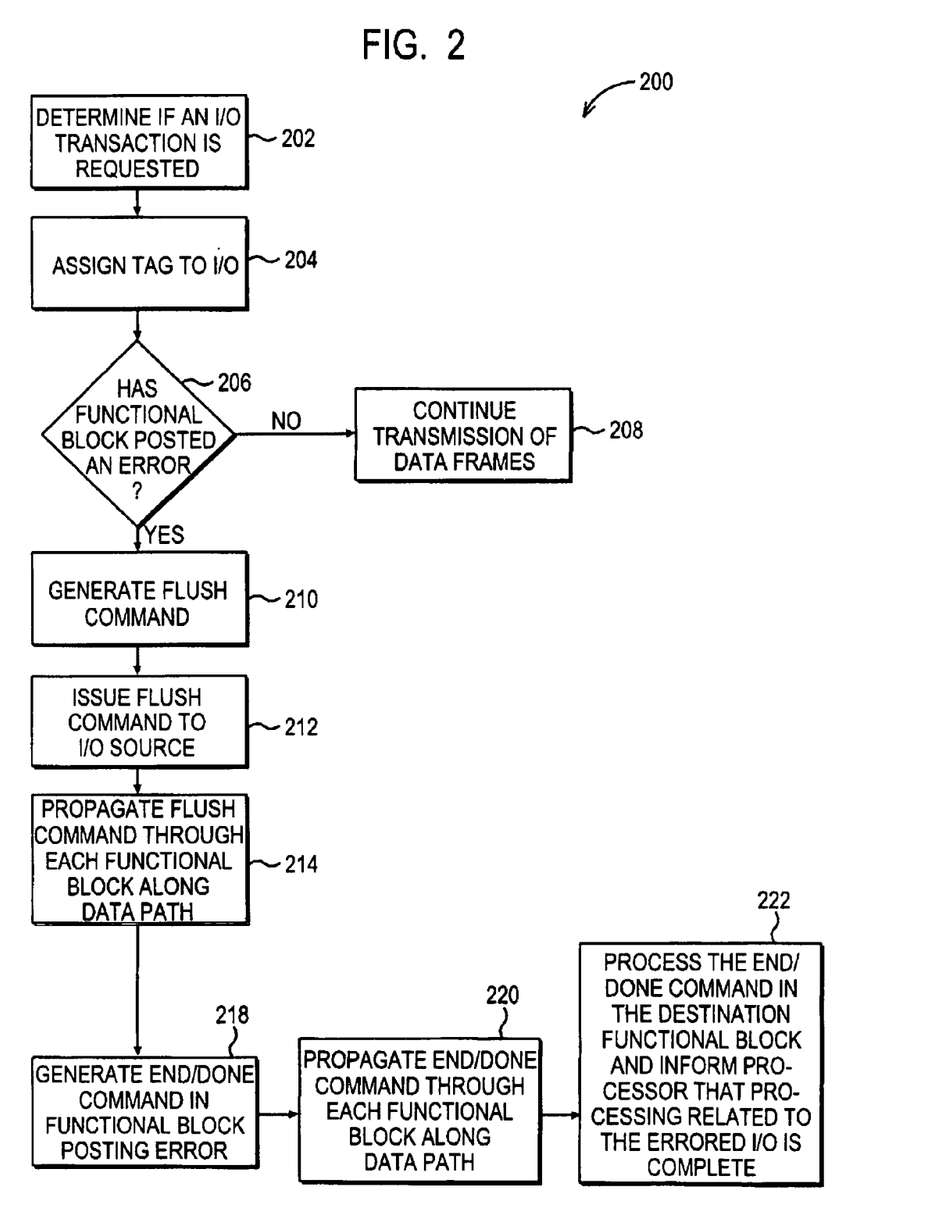
FIG. 2 is a flowchart illustrating exemplary operations that may be performed according to an embodiment.

FIG. 2 depicts a flowchart 200 illustrating exemplary operations that may be performed according to an embodiment. With continued reference to a system embodiment of FIG. 1, operations may commence with a determination, at least in part, if an I/O transaction is requested 202. For example, processor 102 may receive a read instruction from a destination functional block 108 to begin transmitting data from a source functional block 106. Alternatively or additionally, a read request can be generated by other functional blocks in the system. Operations may include assigning a tag to an I/O 204. For example, processor 102 may be capable of assigning a tag to the I/O transaction, which may comprise a tag identifier. In an exemplary embodiment, source functional block 106 begins transmitting data frames through one or more intermediate functional blocks (e.g., FBN . . . FB3, FB2, FB1, etc) along a data path 114. Operations may also include determining, at least in part, if a functional block has posted an error 206. For example, a functional block may detect an error when processing a data frame. If an error is detected the functional block may be capable of posting the error to the processor 102. Of course, if no error occurs, transmission of data frames may continue 208.

Operations may also include generating a flush command 210. This operation may also include generating a flush command for a particular tag (in the event, for example, multiple tags are present, which may mean multiple I/Os are present in the system). For example, processor 102 may be capable of generating a flush command directed to one or more I/Os. Operations may also include issuing the flush command to an I/O source 212. Processor 102 may be capable of issuing a flush command to a source functional block upon the occurrence of an error. Such a flush command may be directed to a particular tag and may cause the source functional block to stop getting data for the I/O that has an error. In a pipelined system, as may be defined herein, operations may also include propagating the flush command through each functional block in the system along the data path 214. The flush command, when received by a functional block, may operate to cause the functional block to ignore data associated with a particular I/O.

Operations may also include generating an end/done command 218, for example, for the I/O after the flush command is received in a functional block that posted the error. Operations may also include propagating the end/done command through the system 220. When the end/done command reaches a destination functional block, operations may also include processing of the end/done command by the destination functional block and informing the processor 102 that processing related to the errored I/O is complete 222. This may operate to inform the processor 102 that the system is flushed of any data packets associated with the errored I/O, and the destination functional block may terminate processing of the errored I/O.

Figure 3:
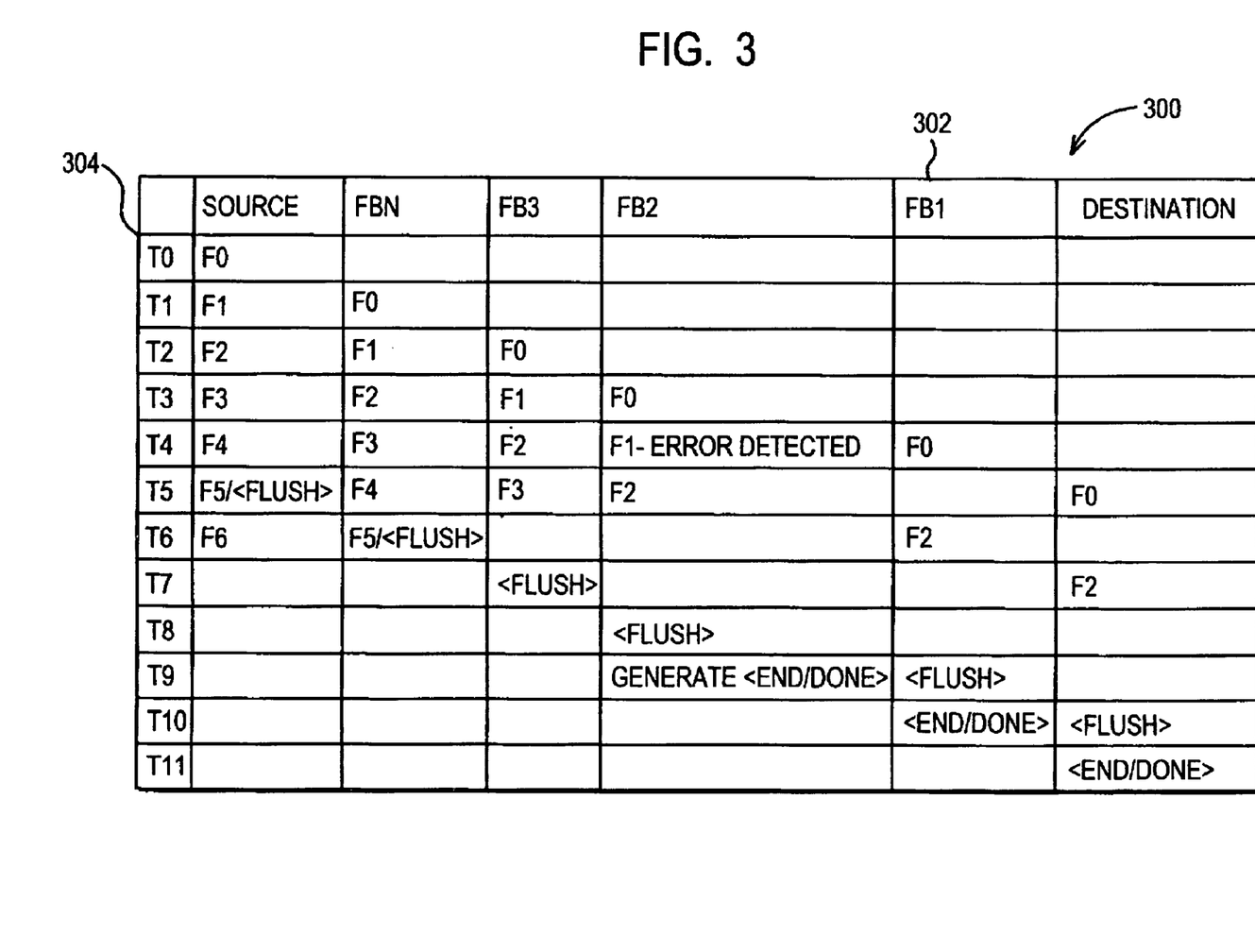
FIG. 3 is a table illustrating exemplary operations that may be performed according to an embodiment.
Figure 4:
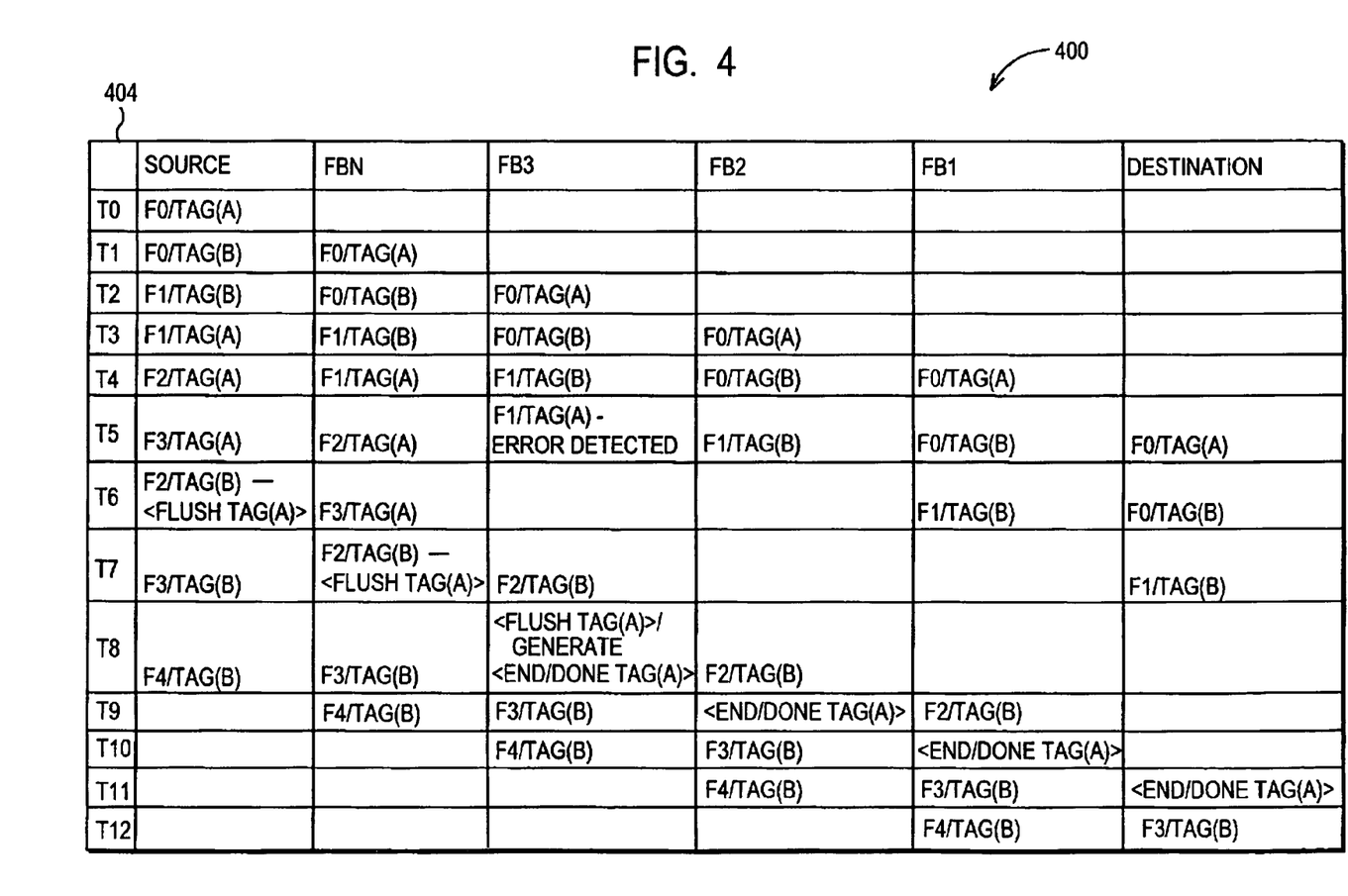
FIG. 4 is a table illustrating exemplary operations that may be performed according to an embodiment.

The following description of FIGS. 3 and 4 refer to exemplary operational characteristics of the system 100 of FIG. 1.

Single I/O

FIG. 3 is a table 300 illustrating exemplary operations that may be performed according to an embodiment. The top row 302 represents exemplary functional blocks which may exists in a system. The first column 304 represents time intervals T0, T1, T2, . . . ,T12. The time period may be arbitrary, and further it may be assumed for this example that a data frame is processed by each functional block in one time interval. The table 300 depicts a plurality of data frames, represented by F0, F1, F2, . . . , F6. These data frames may be generated, for example for a particular I/O, which may include a read request from a source functional block ("Source") through a plurality of intermediate functional blocks ("FBN", "FB3", "FB2", "FB1") to a destination functional block ("Destination"). Table 300 may represent a pipelined data transmission, as defined herein.

In time interval T0, data frame F0 may be processed by the Source. In time interval T1, data frame F1 may processed by the source and frame F0 may be processed by the next functional block in the data path, i.e., FBN. These operations may continue as long as no errors are detected in a functional block. In time interval T5, assume that an error occurs in FB3 while processing frame 3 (F3). FB3 may generate an error signal to a processor indicating that an error has been detected. The processor may be capable of generating a flush command, for example a command in the form of <flush>, for example in the next time interval T6. Alternatively, FB3 may be capable of generating a block command for the errored I/O, for example, in the next time interval T6. A block command, as may be generated by a functional block, may operate to block subsequent data packets from an errored I/O. A block command may operate to prevent additional data frames from being transmitted to subsequent functional blocks along a data path. The flush command may be processed by a source functional block and then propagated through each functional block, for example in subsequent time intervals as depicted for FBN at time interval T7 and FB3 at time interval T8. When the flush command reaches FB3, FB3 may be capable of transmitting a signal to processor indicating that FB3 has received a flush command. The processor may be capable of interpreting such a message as an indication that all data generated after the errored frame has been properly purged from the system. Since this example assumes a pipelined system, data frames F0, F1 and F2, may continue to be processed by subsequent functional blocks until these frames reach the Destination.

When the flush command is processed by FB3, FB3 may generate an end/done command, for example in time interval T9. Alternatively, an end done command may be generated in the same time interval as receiving a flush command (for example T8). The end/done command may be propagated to, and processed by, subsequent functional blocks, for example FB2 in time interval T0, FB1 in time interval T11 and the Destination in time interval T12. The end/done command may be transmitted to the processor and may operate to inform the processor 102 that the system is flushed of any data packets associated with the errored I/O. The Destination may terminate processing of the errored I/O, instead of waiting for more frames in the errored I/O.

The table 300 represents a single error occurring in a data transmission. However, multiple errors for different data frames associated with a single I/O may occur in other functional blocks. In this instance, a signal may be generated by more than one functional block to a processor indicative of an error. The processor may generate a plurality of flush commands for each error detected and issue the flush commands to each functional block that detected an error. Further, a processor may be capable of generating flush commands in a first-in-first-out manner, so that, for example, at least one flush command reaches the last functional block to report an error. Also, the example set forth in Table 300 assumes data frames traveling from the source 106 to the destination 108, however, it should be noted that the system 100 depicted in FIG. 1 may be capable of transmitting data frames in the reverse order, either independently of any other transmission or simultaneously with a data frame transmission from source 106 to destination 108.

Multiple I/Os

FIG. 4 is a table 400 illustrating exemplary operations that may be performed according to an embodiment. The top row 402 represents exemplary functional blocks which may exists in a system. The first column 404 represents time intervals T0, T1, T2, . . . ,T12. The time period may be arbitrary, and further it may be assumed for this example that a data frame is processed by each functional block in one time interval. The table depicts a plurality of data frames, represented by F0, F1, F2, F3, F4. The table 400 also depicts two I/Os, represented by Tag (A) and Tag (B). Tag (A) and Tag (B) may be assigned by a processor, and may represent transactions that may take place within a collection of functional blocks. For example, Tag (A) may represent a read data transaction between a source and a destination functional block (which may be through one or more intermediate functional blocks), and Tag (B) may represent a write data transaction from a destination functional block to a source functional block (which may also be through one or more intermediate functional blocks). Table 400 may represent a pipelined data transmission, as may be defined herein.

In the table 400, at time interval T0, frame F0 associated with Tag (A) may be processed by the Source functional block. At time interval T1, frame F0 associated with Tag (B) may be processed by the Source and frame F0 associated with Tag (A) may be transmitted by the Source to FBN and may be processed by FBN. At time interval T2, frame F1 associated with Tag (B) may be processed by the source, while frames F0/Tag(B) and F0/Tag(A) may be transmitted to subsequent functional blocks (i.e., FBN and FB3) and may further be processed by these functional blocks. These operations may continue as long as no errors are detected in a functional block. In time interval T5, assume that an error occurs in FB3 while processing frame 1 association with Tag(A) (F3/Tag(A)). FB3 may generate an error signal to a processor indicating that an error has been detected. The processor may be capable of generating a flush command, for example <flush Tag(A)>, for example in the next time interval T6. The flush command may be propagated through each functional block, for example in subsequent time intervals as depicted for FBN at time interval T7 and FB3 at time interval T8. When the flush command reaches FB3, FB3 may be capable of transmitting a signal to processor indicating that FB3 has received a flush command. The processor may be capable of interpreting such a message as an indication that all data associated with the error has been properly purged from the system. Since this example assumes a pipelined system, data frame F0 associated with Tag(A) may continue to be processed by subsequent functional blocks until these frames reach the Destination. Further, data frames associated with Tag(B) can continue to be processed and transmitted through each functional block until processing is completed through the Destination.

When the flush command is processed by FB3, FB3 may generate an end/done command, for example in time interval T8. The end/done command may specify the errored I/O, Tag (A), and may be of the form <end/done Tag (A)>. The end/done command may be propagated to, and processed by, subsequent functional blocks, for example FB2 in time interval T9, FB1 in time interval T10 and the Destination in time interval T11. The end/done command may be transmitted to the processor and may operate to inform the processor 102 that the system is flushed of any data packets associated with the errored I/O Tag (A). The Destination may terminate processing of the errored I/O Tag (A) instead of waiting for more frames in the errored I/O.

The table 400 represents a single error occurring in a data transmission. However, multiple errors for different data frames associated with a single I/O may occur in other functional blocks. In this instance, a signal may be generated by more than one functional block to a processor indicative of an error. The processor may generate a plurality of flush commands for each error detected and issue the flush commands to each functional block that detected an error. Further, a processor may be capable of generating flush commands in a first-in-first-out manner, so that, for example, at least one flush command reaches the last functional block to report an error. Moreover, errors in other I/Os (for example an error associated with Tag(B)) may also occur. In this instance, the processor may be capable of generating multiple flush commands directed at a plurality of tags in operation.

Figure 5:
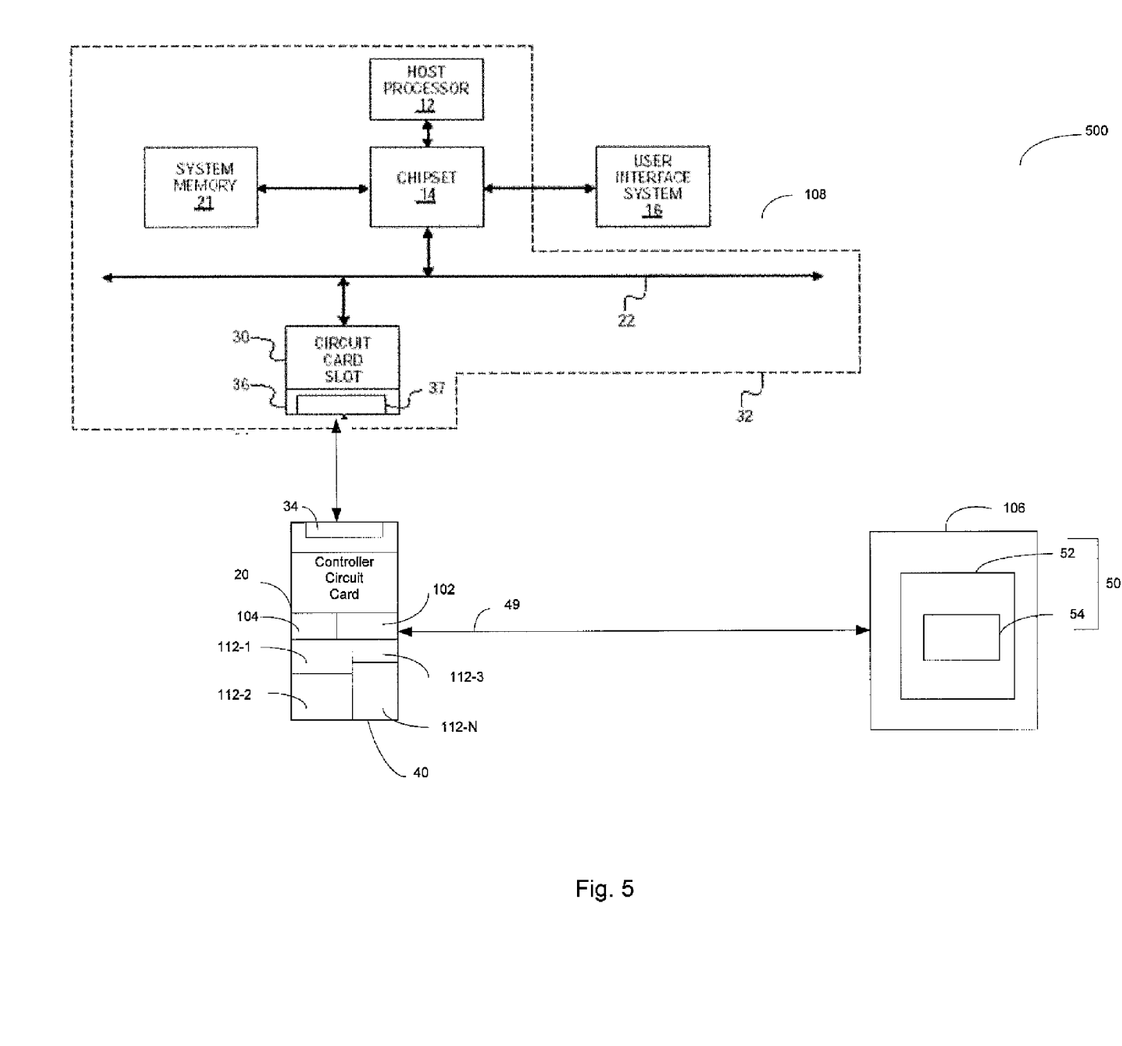
FIG. 5 is a diagram illustrating another exemplary system embodiment.

FIG. 5 illustrates another exemplary system embodiment 500 of the claimed subject matter. Without departing from the scope of this embodiment, and only as an example, a destination functional block 108 may comprise a host system and source functional block 106 may comprise one or more mass storage devices. In such an example, the host system 108 may issue a command to one or more mass storage devices to begin a data transfer from the storage device to the host system. The host system may comprise, for example, a computer system that is capable of communicating with one or more storage devices over a communication link (not shown). A mass storage controller card 20 may comprise one or more integrated circuits 40 capable of communicating between the host system 108 and mass storage 106. Integrated circuit 40 may include one or more intermediate functional blocks, i.e., functional blocks between the source 106 and the destination 108 (e.g., 112-1, 112-2, 112-3, . . . , 112-N) capable of transmitting and/or receiving data between the hosts system 108 and mass storage 106. Controller circuit card 20 may be capable of communicating with a storage device using one or more communications protocols.

Host system 108 (e.g., destination functional block) may generally include processor 12, a bus 22, a user interface system 16, a chipset 14, system memory 21, a circuit card slot 30, and a circuit card 20 configured to communicate with storage array 50. The host processor 12 may include any variety of processors known in the art such as an Intel® Pentium® IV processor commercially available from the Assignee of the subject application. The bus 22 may include various bus types to transfer data and commands. For instance, the bus 22 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 22 may also comply with the PCI-X Specification Rev. 1.0a, Jul. 24, 2000, available from the aforesaid PCI Special Interest Group, Portland, Oreg., U.S.A.

The user interface system 16 may include a variety of devices for human users to input commands and/or data and to monitor the system such as a keyboard, pointing device, and video display. The chipset 14 may include host bridge/hub system (not shown) that couples the processor 12, system memory 21, and user interface system 16 to each other and to the bus 22, and may comprise a host system. Chipset 14 may include integrated circuit chips, such as those selected from integrated circuit chipsets commercially available from the assignee of the subject application (e.g., graphics memory and I/O controller hub chipsets), although other integrated circuit chips may also, or alternatively be used. The processor 12, system memory 21, chipset 14 and circuit card slot 30 may be integrated onto one circuit board, e.g. motherboard 32. The processor 12, system memory 21, chipset 14 and circuit card slot 30 may collectively comprise a host computer system.

The circuit card 20 may be constructed to permit it to be inserted into slot 30. When the circuit card 20 is properly inserted into slot 30, connectors 34 and 37 become electrically and mechanically coupled to each other. When connectors 34 and 37 are so coupled to each other, the card 20 becomes electrically coupled to bus 22 and may exchange data and/or commands with system memory 21, host processor 12, and/or user interface system 16 via bus 22 and chipset 14. Alternatively, without departing from this embodiment, the operative circuitry of the circuit card 20 may be included in other structures, systems, and/or devices. These other structures, systems, and/or devices may be, for example, in the motherboard 32, coupled to the bus 22.

Controller card 20 may be coupled to and control the operation of mass storage 50. In this embodiment, mass storage 50 may comprise, e.g., one or more redundant arrays of independent disks (RAID) 52. RAID 52 may comprise, for example, one or more disk mass storage devices and/or one or more peripheral devices (collectively or singly shown in FIG. 1 by the block referred to by numeral 54). The RAID level that may be implemented by RAID 52 may be a RAID level 0, 1 or number greater than 1.

Circuit card 20 may communicate with storage array 50 using a plurality of communications protocols. The circuit card 20 may comprise an integrated circuit 40 and computer-readable memory 38.

Integrated circuit 40 may comprise a plurality of intermediate functional blocks 112-1, 112-2, 112-3, . . . , 112-N, which collectively or individually may be capable of communicating with mass storage 106. For example, one or more intermediate functional blocks may comprise initiator engine circuitry and RAID controller circuitry. Integrated circuit 40 may also comprise processor circuitry 102. Processor circuitry 102 may comprise the aforementioned Intel® XScale™ Core micro-architecture.

Integrated circuit 40 may be capable of initiating communication between the host system and the storage array 52 using a plurality of different communication protocols. If a Fibre Channel (FC) protocol is used by integrated circuit 40 to exchange data and/or commands with storage array 52, it may comply or be compatible with the interface/protocol described in ANSI Standard Fibre Channel Physical and Signaling Interface-3 X3.303:1998 Specification. Alternatively or additionally, if a serial ATA (S-ATA) protocol is used by integrated circuit 40 to exchange data and/or commands with storage array 52, it may comply or be compatible with the protocol described in "Serial ATA: High Speed Serialized AT Attachment," Revision 1.0, published on Aug. 29, 2001 by the Serial ATA Working Group. Further alternatively or additionally, if a serial attached small computer system interface (SAS) protocol is used by integrated circuit 40 to exchange data and/or commands with storage array 52, it may comply or be compatible with the protocol described in "Information Technology—Serial Attached SCSI—1.1," Working Draft American National Standard of International Committee For Information Technology Standards (INCITS) T10 Technical Committee, Project T10/1562-D, Revision 1, published Sept. 18, 2003, by American National Standards Institute (hereinafter termed the "SAS Standard") and/or later-published versions of the SAS Standard. The SAS protocol may comprise Serial Advanced Attachment (ATA) Tunneled Protocol (STP) and Serial Small Computer System Interface (SCSI) Protocol (SSP). Of course, other alternative communication protocols and/or after-developed communication protocols may be used by circuit card 20 without departing from this embodiment, and such alternative and/or after-developed communications protocols shall be deemed equivalent communications protocols.

Card 20 may be coupled to mass storage 50 via one or more network communication links 49. As set forth above, card 20 may exchange data and/or commands with mass storage 52, via link 49, using, e.g., S-ATA, SAS and/or FC communication protocols. Of course, alternatively, card 20 may exchange data and/or commands with mass storage 50 using other and/or additional communication protocols, without departing from this embodiment.

In this embodiment, intermediate functional blocks 112-1, 112-2, 112-3, . . . , 112-N comprised in circuit card 20 may be coupled along a bus (not shown), for example a processor bus. Controller card processor 102 may be capable of exchanging commands and data with intermediate functional blocks 112-1, 112-2, 112-3, . . . , 112-N.

Destination functional block 108 (i.e., host system in this embodiment) may initiate one or more commands, via circuit card 20, to transfer data from source functional block 106 (i.e., storage array in this embodiment). In accordance with previous embodiments described herein, processor 102 may be capable of assigning a tag to a data transfer transaction (I/O) between source 106 through one or more intermediate functional blocks 112-1, 112-2, 112-3, . . . , 112-N (comprised in integrated circuit 40) to destination 108. Such a data transfer may comprise a stream of data frames transmitted from source 106 to destination 108, via one or more intermediate functional blocks 112-1, 112-2, 112-3, . . . , 112-N. If an error occurs in such a transaction, processor 102 may be capable of generating one or more flush commands and/or one or more end/done commands, in a manner described above with reference to FIGS. 1-4.

Thus, in summary, one system embodiment may comprise a circuit card including an integrated circuit, the circuit card capable of being coupled to a bus, the integrated circuit may comprise processor circuitry capable of exchanging at least one of commands and data with a plurality of functional blocks. The functional blocks may be capable of at least one of transmitting or receiving one or more data frames and further may be capable of discovering if an error occurs in at least one data frame. The processor circuitry may also capable of assigning a tag to at least one transactions in which at least one data frame is at least one of transmitted and received by at least one functional block, associating the error with the tag, and generating a flush command to at least one functional block to flush data frames associated with the tag.

One article embodiment may include a storage medium having stored thereon instructions that when executed by a machine results in assigning a tag to at least one transactions in which at least one data frame is at least one of transmitted or received by at least one functional block. The instructions, when executed by the machine, may also result in discovering, by the functional block, if an error occurs in said at least one data frame. The instructions, when executed by the machine, may also result in associating the error with the tag and generating a flush command to at least one functional block to flush data frames associated with the tag.

When an error occurs, in any embodiment described herein, processor 102 may be capable of investigating the error without terminating processing of data frames associated with an errored I/O or data frames associated with other I/Os. Further, when a flush command reaches the functional block that generated the error, that functional block may be capable of notifying the processor, at which point the processor may be capable of investigating the error and/or ignoring the error and generating a command to resume transmission of data frames associated with an errored I/O. The processor 102 may be capable of generating a terminate command to terminate all processing of data frames in an I/O. The terminate command may be propagated through each functional block. The source functional block, upon receiving a terminate command, may stop obtaining and processing more data for the terminated I/O. The destination functional block may receive a terminate command and recognize that no more processing for that I/O is required. The destination functional block may report the terminate command to the processor.

The tag, as used herein, may also include buffer pointer data capable of pointing to a specific location in memory (such as tag memory 104). A data frame may comprise a specified number of bytes of data. The tag may also include relative offset information that may be capable of pointing to a specific byte of a data frame that has generated an error. Thus, for example, a relative offset may include the byte within a data frame in which an error has occurred. Processor 102 may be capable of using relative offset information, for example, to generate a command to a source functional block retransmit data starting at a particular byte, as indicated by a relative offset.

The embodiments described herein may offer enhanced data protection. Also, the embodiments described herein may offer end-to-end data protection which may offer, for example, the ability to distribute error handling among a plurality of functional blocks along a data path. In at least one embodiment described herein, real time error handling may be capable without requiring a system halt or degrading system throughput. Also, in both single and multiple I/O embodiments described herein, data frames can continue to be processed in functional blocks after an error occurs.

In certain embodiments described herein, a functional block and/or processor may be capable of generating a flush command and/or an end/done command, with respect to one or more I/Os when an error occurs in a data frame. However, in certain data transfer application it may not be necessary to flush all data when an error occurs. For example, in a data transfer involving a large quantity of data (for example, video and/or audio data transmission), the processor and functional blocks may be permitted to allow certain errors to occur and/or to allow a certain number of errors before generating a flush and/or end/done command. Thus, in at least one alternative embodiment described herein, the processor and/or functional blocks may be capable of allowing a selected threshold number of errors through the system, and/or certain errors may be ignored.

Those skilled in the art may recognize numerous modifications, alterations or enhancements to one or more of the embodiments described herein. For example, data path 114 depicted in FIG. 1 may alternatively comprise one or more data paths (for example, a parallel data path) that may include a plurality of individual data paths formed between differing functional blocks. As stated previously herein, the diagram depicted in FIG. 1 is intended to cover a wide range of applications, including, for example, data protection within an IC, within an ASIC, between a plurality of ICs and/or ASICs, or at a broad system level. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

The invention claimed is:

1. A method, comprising:
    assigning a tag to a transaction in which a data frame is at least one of transmitted or received by a source functional block, a destination functional block, and one or more intermediate functional blocks coupled along a data path such that the data frame is moved from one functional block to the next;
    discovering, by at least one of said intermediate functional blocks, if an error occurs in said data frame; and associating said error with said tag and generating a flush command that is propagated through the functional blocks to said at least one intermediate functional block to flush data frames associated with said tag.

2. The method of claim 1, wherein:
said tag comprises identification data associated with an input/output (I/O).

3. The method of claim 2, wherein:
said I/O comprises a transaction of at least one of a data read or data write.

4. The method of claim 1, wherein:
assigning a tag is performed, at least in part, by processor circuitry capable of exchanging at least one of commands or data with one or more of said functional blocks.

5. The method of claim 4, wherein:
said processor circuitry is also capable of receiving a transaction request, and further capable of assigning said tag to said at least one transaction in response to said transaction request.

6. The method of claim 1, wherein:
said functional block comprising circuitry capable of, at least one of, transmitting or receiving at least one said data frame.

7. The method of claim 1, further comprising:
generating a command indicating that processing of said at least one data packet associated with said tag is complete.

8. An article, comprising:
a storage medium having stored thereon instructions that when executed by a machine results in the following:
assigning a tag to a transaction in which a data frame is at least one of transmitted or received by a source functional block, a destination functional block, and one or more intermediate functional blocks coupled along a data path such that the data frame is moved from one functional block the next;
discovering, by at least one of said intermediate functional blocks, if an error occurs in said data frame; and
associating said error with said tag generating a flush command that is propagated through the functional blocks to said at least one intermediate functional block to flush data frames associated with said tag.

9. The article of claim 8, wherein:
said tag comprises identification data associated with an input/output (I/O).

10. The article of claim 9, wherein:
said I/O comprises a transaction of at least one of a data read or data write.

11. The article of claim 8, wherein:
assigning a tag is performed, at least in part, by processor circuitry capable of exchanging at least one of commands or data with one or more of said functional blocks.

12. The article of claim 11, wherein:
said processor circuitry is also capable of receiving a transaction request, and further capable of assigning said tag to said at least one transaction in response to said transaction request.

13. The article of claim 8, wherein:
at least one of said functional blocks comprises circuitry capable of, at least one of transmitting or receiving at least one said data frame.

14. The article of claim 8, further comprising:
generating a command indicating that processing of said at least one data packet associated with said tag is complete.

15. A system, comprising:
a circuit card including an integrated circuit, the circuit card capable of being coupled to a bus, the integrated circuit comprising processor circuitry capable of exchanging at least one of commands or data with a plurality of functional blocks including a source functional block, a destination functional block, and one or more intermediate functional blocks coupled along a data path such that the command or data is moved from one functional block to the next, each of said functional blocks being capable of at least one of transmitting or receiving a data frame,
said processor circuitry is further capable of
discovering, by at least one of said intermediate functional blocks, if an error occurs in said data frame,
assigning a tag to a transaction in which a data frame is at least one of transmitted or received by one or more of said plurality of functional blocks,
associating said error with said tag, and
generating a flush command that is propagated through the functional blocks to said at least one intermediate functional block to flush data frames associated with said tag.

16. The system of claim 15, wherein:
said source functional block is capable of starting a transmission of said data frame to said one or more intermediate functional blocks, and said destination functional block comprises a destination for said data frame.

17. The system of claim 16, wherein:
said processor circuitry is also capable of determining which functional block, among the plurality of said functional blocks, discovered said error, said processor circuitry further capable of commanding said source functional block to flush at least one data frame associated with said tag and propagating a command to flush a data frame associated with said tag to at least one of said intermediate functional blocks and said destination functional block.

18. The system of claim 17, wherein:
said processor circuitry is also capable of terminating said command to flush a data frame when said command to flush a data frame is transmitted to said functional block responsible for discovering said error.

19. The system of claim 15, wherein:
said tag comprises identification data associated with an input/output (I/O).

20. The system of claim 19, wherein:
said I/O comprises a transaction of at least one of a data read or data write in which said data frame is at least one of transmitted or received by at least one functional block.

21. The system of claim 15, wherein:
said processor circuitry is also capable of receiving a transaction request from at least one of said plurality of functional blocks, and further capable of assigning said tag to a transaction in response to said transaction request.

22. The system of claim 15, wherein:
at least one of said plurality of functional blocks comprises circuitry capable of, at least one of, transmitting or receiving a data frame.

23. The system of claim 15, wherein:
said processor circuitry is further capable of terminating said flush command when said flush command reaches a functional block that discovered said error.

24. The method of claim 16, further comprising:
generating, by said functional block that discovered said error, a command indicating that data processing for said transaction is complete, and propagating said a command indicating that data processing for said transaction is complete to said destination functional block.

* * * * *